United States Patent
Orcutt et al.

(10) Patent No.: US 10,571,331 B2
(45) Date of Patent: Feb. 25, 2020

(54) SELF-CLOCKED LOW NOISE PHOTORECEIVER (SCLNP)

(71) Applicant: International Business Machines Corporation, Armonk, NY (US)

(72) Inventors: Jason S. Orcutt, Katonah, NY (US); Paul M. Solomon, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 61 days.

(21) Appl. No.: 15/856,776

(22) Filed: Dec. 28, 2017

(65) Prior Publication Data

US 2018/0120153 A1   May 3, 2018

Related U.S. Application Data

(63) Continuation of application No. 15/245,660, filed on Aug. 24, 2016, now Pat. No. 9,915,561.

(51) Int. Cl.
*G01J 1/44* (2006.01)
*G02B 6/12* (2006.01)

(52) U.S. Cl.
CPC ............ *G01J 1/44* (2013.01); *G02B 6/12004* (2013.01)

(58) Field of Classification Search
CPC .......... G01J 1/44; G01J 1/0228; G01J 1/0204; G01J 1/0459; G01J 1/0425; G01J 1/0448; G01J 2001/0481; G02B 6/1228; G02B 6/12004; G02B 6/4274; G02B 2006/12154
USPC .................................................. 250/214 DC
See application file for complete search history.

(56) References Cited

U.S. PATENT DOCUMENTS

| | | | |
|---|---|---|---|
| 5,060,305 | A | 10/1991 | Prucnal et al. |
| 5,822,104 | A | 10/1998 | Saito |
| 5,963,351 | A | 10/1999 | Kaplounenko et al. |
| 6,420,895 | B1 | 7/2002 | Herr et al. |
| 6,545,786 | B1 | 4/2003 | Park et al. |
| 6,734,907 | B1 * | 5/2004 | Hagihara ............. H04N 3/1512 348/302 |
| 6,919,549 | B2 | 7/2005 | Bamji et al. |
| 7,502,240 | B2 | 3/2009 | Leung et al. |
| 9,215,114 | B2 | 12/2015 | Emami-Neyestanak et al. |

(Continued)

OTHER PUBLICATIONS

Assefa, S., et al., "A 90nm CMOS integrated Nano-Photonics Technology for 25Gbps WDM Optical Communications Applications," 2012 International Electron Devices Meeting (IEDM), Dec. 2012, 3 pages.

(Continued)

*Primary Examiner* — Seung C Sohn
(74) *Attorney, Agent, or Firm* — Scully, Scott, Murphy & Presser, P.C.; L. Jeffrey Kelly, Esq.

(57) ABSTRACT

A photoreceiver device includes a light detector connected between a power supply node and a first node, and first to third switching elements. The light detector is configured to detect an incident optical data signal, and to output photocurrent corresponding to a magnitude of the optical data signal through the first node. The first switching element is connected between the first node and a ground node. The second switching element is connected between the power supply node and a second node. The third switching element is connected between the second node and the ground node. The third switching element has a control node connected to the first node.

12 Claims, 12 Drawing Sheets

(56) References Cited

U.S. PATENT DOCUMENTS 9,337,234 B2 * 5/2016 Hayashi ............... H04N 5/3745
9,915,561 B1 * 3/2018 Orcutt ....................... G01J 1/44

OTHER PUBLICATIONS

Georgas, M., et al., "A Monolithically-Integrated Optical Receiver in Standard 45-nm SOI," IEEE Journal of Solid-State Circuits, Jul. 2012, pp. 1693-1702, vol. 47, No. 7.

Logan, D.F., et al., "Defect-Enhanced Silicon-on-Insulator Waveguide Resonant Photodetector With High Sensitivity at 1.55 um," IEEE Photonics Technology Letters, Oct. 2010, pp. 1530-1532, vol. 22, No. 20.

Saeedi, S., et al., "A 25Gb/s 3D-Integrated CMOS/Silicon-Photonic Receiver for Low-Power High-Sensitivity Optical Communication," Journal of Lightwave Technology, Oct. 2015, 10 pages.

Shainline, J.M., et al., "Multi-modal optical microcavities for loss avoidance," CLEO: 2013 Technical Digest, Optical Society of America, Jun. 2013, 2 pages.

\* cited by examiner

SELF-CLOCKED LOW NOISE PHOTORECEIVER (SCLNP)

FIELD

The present disclosure relates to a photoreceiver, and more specifically, to a self-clocked photoreceiver with low noise and low power consumption and a method of operating the photoreceiver.

BACKGROUND

Typical photoreceivers using either a voltage amplifier, a transimpedance amplifier or a phototransistor need to extract photo-generated current either using bias resistors or base current of the phototransistor, so that shot noises may be generated in addition to shot noises of photons themselves and may limit the ultimate sensitivity of the photoreceivers.

The bias current limitation may be circumvented using a switched (or clocked) photoreceiver, where the photo-generated charge may be drained away at a time when the system is insensitive to noise. The switched photoreceiver may be less noisy than other photoreceivers. However, the switching circuitry can be power consuming and synchronization with input data stream may be difficult. Thus, a photoreceiver design with less noisy and low power consumption is needed.

SUMMARY

In one aspect there is provided a photoreceiver device. The photoreceiver device includes a first switching element, a second element, a third element, and a light detector. Prior to receipt of an optical data signal, the first switching element is configured to be switched on in response to a first control signal to pull down a first node of the first switching element. A second node of the first switching element is coupled to a ground node. Prior to receipt of an optical data signal, the second switching element is configured to be switched on, in response to a second control signal, to pull up a first node of the second switching element. A second node of the second switching element is coupled to a power supply node. The light detector is configured to receive the optical data signal, generate photocurrent corresponding to a magnitude of the optical data signal, and output the generated photocurrent through the first node of the first switching element. The third switching element is configured to be switched on, in response to a first magnitude of the photocurrent, to pull down the first node of the second switching element in response to a first magnitude of the photocurrent, wherein the first magnitude is more than a threshold voltage of the third switching element.

In another aspect there is provided a receiver system. The receiver system includes a photoreceiver device. The photoreceiver device includes a light detector connected between a power supply node and a first node, and first to third switching elements. The light detector is configured to detect an incident optical data signal, and to output photocurrent corresponding to a magnitude of the optical data signal through the first node. The first switching element is connected between the first node and a ground node. The second switching element is connected between the power supply node and a second node. The third switching element is connected between the second node and the ground node. The third switching element has a control node connected to the first node.

Further, in another aspect, there is provided a method of operating a photoreceiver device. The photoreceiver device includes first to third switching elements and a light detector, wherein a supply voltage is applied to a first node of the light detector and a first node of the second switching element. The method includes, prior to receipt of an optical data signal, pulling down a second node of the light detector by switching on the first switching element based on a first control signal and pulling up a second node of the second switching element by switching on the second switching element based on a second control signal, receiving the optical data signal by the light detector, outputting, by the light detector, photocurrent corresponding to the optical data signal through the second node of the light detector; pulling down the second node of the second switching element by switching on the third switching element when the optical data signal is a data bit 1, and maintaining the pulling up of the second node of the second switching element when the optical data signal is a data bit 0. The third switching element is connected between the second node of the second switching element and a ground node.

DETAILED DESCRIPTION OF THE EMBODIMENTS

Hereinafter, the present inventive concept will be described in detail with reference to the accompanying drawings. In the drawings, the size and relative sizes of layers and regions may be exaggerated for clarity. All the units throughout the specification and drawings may be circuits. Like reference numerals may refer to like elements throughout the written descriptions and drawings.

Figure 1A:
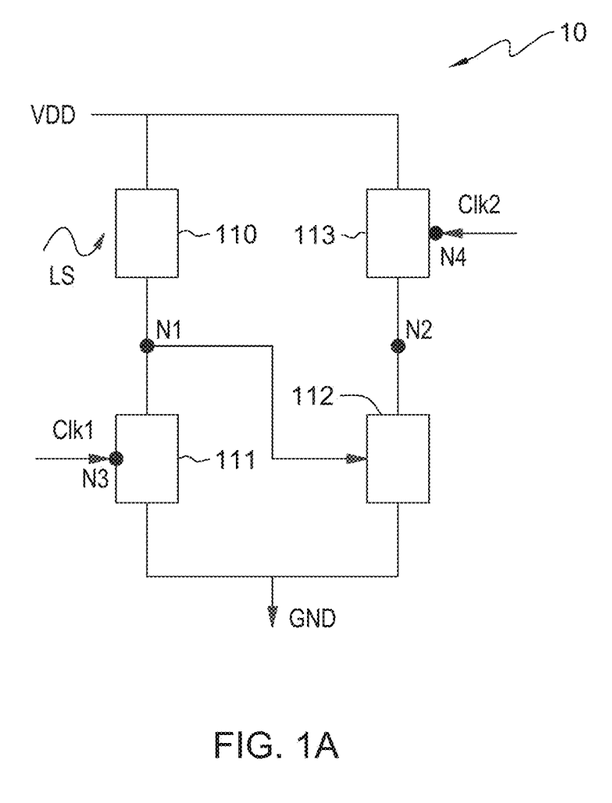
FIG. 1A illustrates a block diagram of a photoreceiver according to a non-limiting exemplary embodiment of the present disclosure.
Figure 1B:
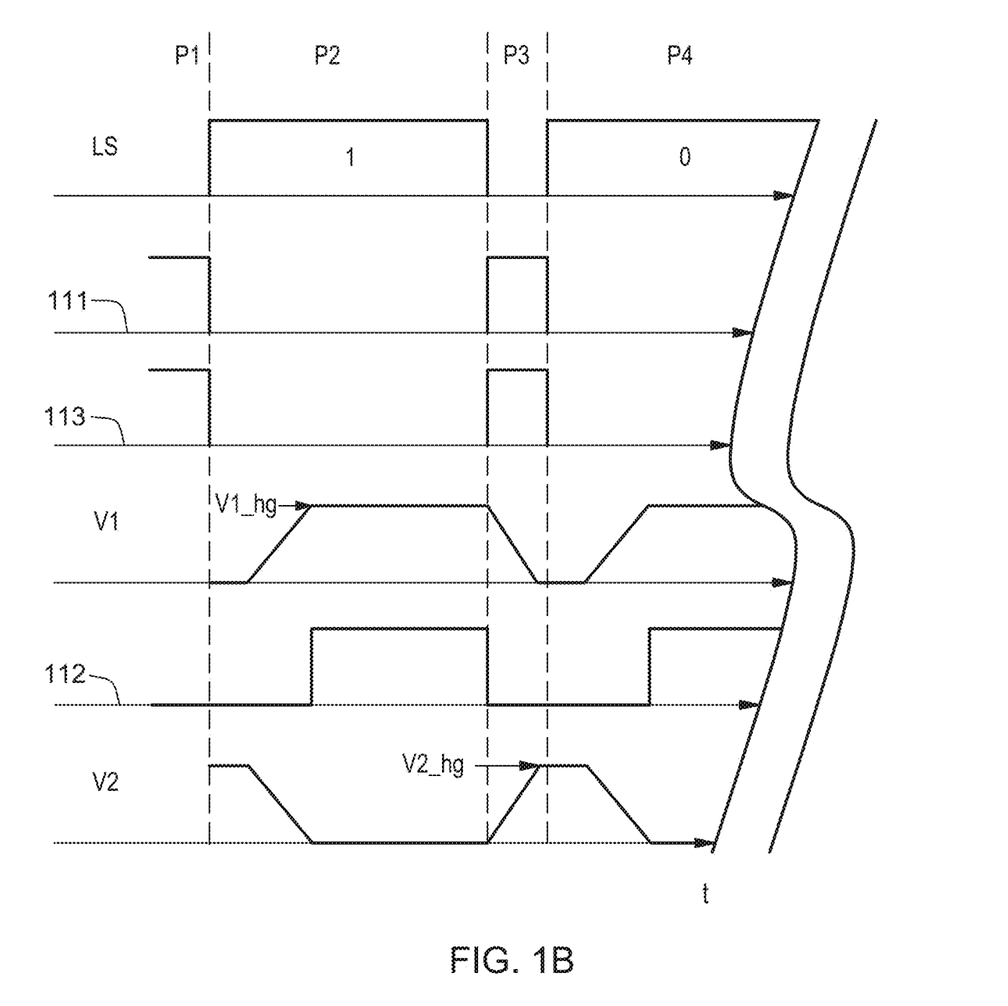
FIG. 1B illustrates signals waveforms of the photoreceiver according to a non-limiting exemplary embodiment of the present disclosure.

FIG. 1A illustrates a block diagram of a photoreceiver 10 according to a non-limiting exemplary embodiment of the present disclosure. FIG. 1B illustrates signals waveforms of the photoreceiver 10 according to a non-limiting exemplary embodiment of the present disclosure.

Referring to FIG. 1A, the photoreceiver 10 may include a light detector 110 and a plurality of switching units 111 to 113. The light detector 110 may be configured to receive an optical data signal LS and convert variations in magnitude of the optical data signal light into photocurrent flowing through a node N1. The light detector 110 may include, but not limited to, a photodiode, a phototransistor, or the like. Each of the switching units 111 to 113 may include transistors including a bipolar junction transistor, a field effect transistor (FET), etc.

The light detector 110 may have one node (e.g., anode) connected to the power supply node VDD with a supply voltage and another node (e.g., cathode) connected to a first node (e.g., a drain) of the switching unit 111 through the node N1.

The switching unit 111 may have a second node (e.g., a source) connected to a ground node GND and may be switched on or off in response to a signal (e.g., Clk1) applied to a control node (e.g., a gate) thereof.

The switching unit 112 may have a control node (e.g., a gate) connected to the node N1 so that the switching unit 112 may be switched on or off according to a voltage signal V1 at the node N1. The switching unit 112 may further have a first node (e.g., a drain) connected to a second node (e.g., a source) of the switching unit 113 through a node N2. A second node (e.g., a source) of the switching unit 112 may be connected to the ground node GND. The switching unit 113 may be connected between the power supply node VDD and the node N2 and may be switched on or off in response to a signal (e.g., Clk2).

As described above, when the optical data signal LS is incident to the light detector 110, the light detector 110 may output photocurrent corresponding to magnitudes of the incident optical data signal LS toward the node N1.

Referring to FIG. 1B, clock pulses Clk1 and Clk2 may be input to the control nodes of the respective switching units 111 and 113. The clock pulses Clk1 and Clk2 may be provided by one or more external devices (not shown).

In a first phase P1 which is prior to detection (or receipt) of the optical data signal LS (e.g., when no optical data signal is input to the photoreceiver 10), the clock pulse Clk1 may be used to have the switching unit 111 switched on to reset (e.g., pull down) the voltage signal V1 at the node N1 to the ground level (or zero), and the clock pulse Clk2 may be used to have the switching unit 113 switched on to precharge (e.g., pull up) a voltage signal V2 at the node N2 to, e.g., the supply voltage of the power supply node VDD, and thus the photoreceiver 10 may be in a ready state to detect a next optical data signal LS input thereto.

In a second phase P2 subsequent to the first phase P1, the optical data signal LS with a data bit "1" may be incident to the photoreceiver 10 and the switching unit 111 and 113 may be switched off in response to the clock pulses Clk1 and Clk2, respectively. Thus, in the second phase P2, the voltage signal V1 at the node N1 may gradually increase up to a voltage level V1_hg due to the photocurrent output from the light detector 110. While the voltage signal V1 at the node N1 is at the voltage level V1_hg (or while the voltage signal V1 at the node N1 exceeds a threshold voltage of the switching unit 112), the switching 112 may be switched on to pull down the voltage signal V2 at the node N2 to the ground level (or zero).

In a third phase P3 subsequent to the second phase P2, the switching units 111 and 113 may be switched on in response to the clock pulses Clk1 and Clk2, respectively, and no optical data signal may be input to the photoreceiver 10, and thus, the voltage signal V1 at the node N1 may gradually decrease to be reset to the ground level (or zero) and the switching unit 112 may be switched off. At this time, the voltage signal V2 at the node N2 may be pulled up to be precharged to, e.g., the supply voltage.

In a fourth phase P4 subsequent to the third phase P3, the optical data signal LS with a data bit "0" may be incident to the photoreceiver 10 and the switching units 111 and 113 may be switched off in response to the clock pulses Clk1 and Clk2, respectively. Since the input data bit is "0", the voltage signal V1 at the node N1 may remain the ground level (e.g., zero) and the switching unit 112 may remain switched off. At this time, the voltage signal V2 at the node N2 may also remain the voltage level V2_hg by being pulled up to the supply voltage.

Since the light detector 110 may include a photodiode as described above, the photocurrent output from the light detector 110 may be obtained by charging a capacitance of the diode itself, a capacitance at the drain of the switching unit 112, and a capacitance at the gate thereof.

In one embodiment, a magnitude of the clock pulse Clk1 may be selected to have the respective switching unit 111 switched on during the first and third phases P1 and P3 and switched off during the second and fourth phases P2 and P4 as shown in FIG. 1B, and a magnitude of the clock pulse Clk2 may be selected to have the respective switching unit 113 switched on during the first and third phases P1 and P3 and switched off during the second and fourth phases P2 and P4 as shown in FIG. 1B.

In one embodiment, if the switching unit 111 is implemented with a transistor (e.g., an n-channel metal oxide semiconductor field effect transistor (MOSFET)) which is switched on in response to a logic high of the clock pulse Clk1, the clock pulse Clk1 may be a logic high during the first and third phases P1 and P3 and a logic low during the second and fourth phases P2 and P4.

Further, in one embodiment, if the switching unit 111 is implemented with a transistor (e.g., a p channel MOSFET) which is switched on in response to a logic low of the clock pulse Clk1, the clock pulse Clk1 may be a logic low during the first and third phases P1 and P3 and a logic high during the second and fourth phases P2 and P4.

Still further, in one embodiment, if the switching unit 113 is implemented with a transistor (e.g., a n-channel MOSFET) which is switched on in response to a logic high of the clock pulse Clk2, the clock pulse Clk2 may be a logic high during the first and third phases P1 and P3 and a logic low during the second and fourth phases P2 and P4.

Still further, in one embodiment, if the switching unit 113 is implemented with a transistor (e.g., a p-channel MOSFET) which is switched on in response to a logic low of the clock pulse Clk2, the clock pulse Clk2 may be a logic low during the first and third phases P1 and P3 and a logic high during the second and fourth phases P2 and P4.

Although it is described with reference to FIG. 1B that the switching unit 112 is switched on in response to a logic high (e.g., V1_hg) of the voltage signal V1 at the node N1; in this case, the switching unit 112 may be implemented with, but not limited to, an n-channel MOSFET. However, exemplary embodiments of the present disclosure are not limited thereto. For example, the switching unit 112 may be switched on in response to a logic low of the voltage signal V1; in this case, the switching unit 112 may be implemented with, but not limited to, a p-channel MOSFET.

Further, signal waveforms of FIG. 1B are only shown for the sake of illustration. However, exemplary embodiments of the present disclosure are not limited thereto.

Figure 2A:
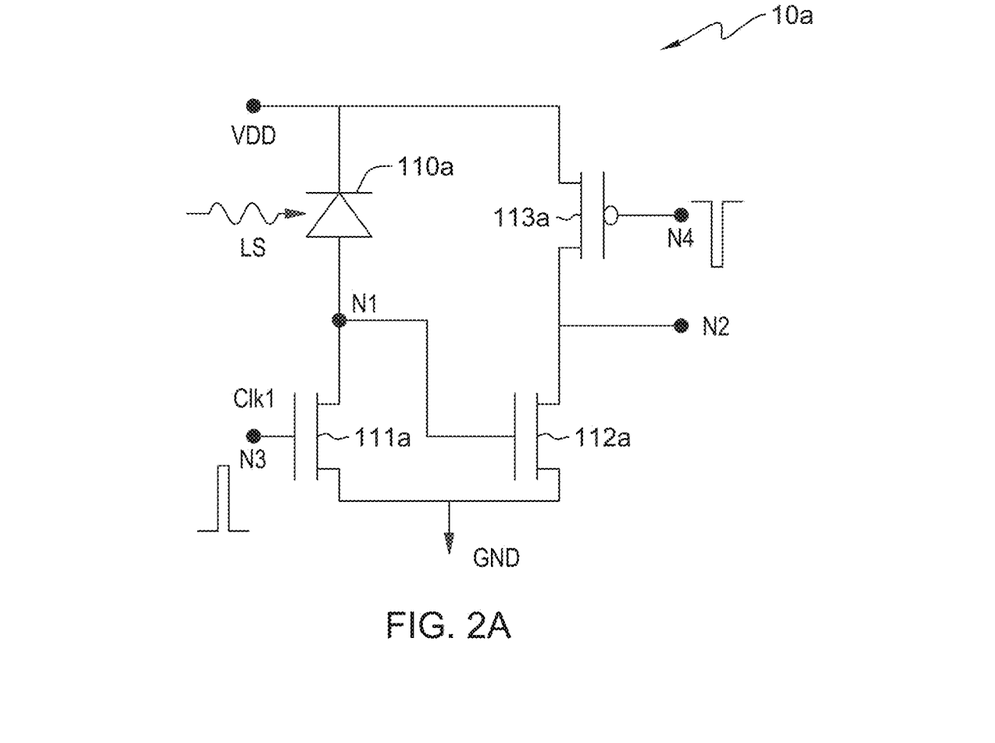
FIG. 2A illustrates a circuit diagram of a photoreceiver when some switching units are implemented with n-channel MOSFETs and another switching unit is implemented with a p-channel MOSFET according to a non-limiting exemplary embodiment of the present disclosure.

FIG. 2A illustrates a circuit diagram of a photoreceiver 10a when switching units 111 and 112 are implemented with n-channel MOSFETs 111a and 112a and a switching unit 113 is implemented with a p-channel MOSFET 113a according to a non-limiting exemplary embodiment of the present disclosure. Thus, the complementary design where the switching units 111 and 113 are implemented with different types of MOSFETs from each other may result in low standby power.

Figure 2B:
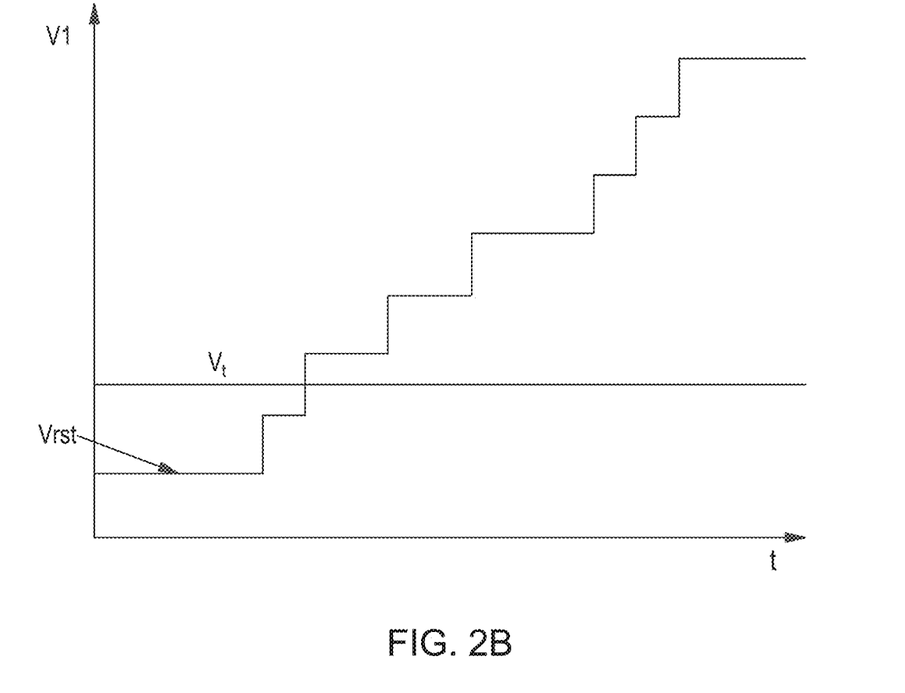
FIG. 2B illustrates a conceptual diagram of a voltage signal at a node of the photoreceiver of FIG. 2A according to a non-limiting exemplary embodiment of the present disclosure.

The signal diagrams of FIG. 1B can be applied for the photoreceiver 10a of FIG. 2A. Thus, referring to FIGS. 2A and 1B, the switching unit 111 may be switched on in the first and third phases P1 and P2 in response to a logic high of the clock pulse Clk1, and the switching unit 111 may be switched off in the second and fourth phases P2 and P4 in response to a logic low of the clock pulse Clk1. In addition, the switching unit 113 may be switched on in the first and third phases P1 and P2 in response to a logic low of the clock pulse Clk2, and the switching unit 113 may be switched off in the second and fourth phases P2 and P4 in response to a logic high of the clock pulse Clk2. Duplicate descriptions thereof will be omitted for the sake of simplicity. FIG. 2B illustrates a conceptual diagram of a voltage signal V1 at a node N1 according to a non-limiting exemplary embodiment of the present disclosure. Referring to FIG. 2B, "Vrst" indicates a voltage level at the node N1 when the photoreceiver 10a is reset in response to the clock pulse Clk1, and "Vt" corresponds to a threshold voltage of the transistor 112a.

In the embodiment described with reference to FIGS. 1A, 1B, 2A, and 2B, the clock pulses Clk1 and Clk2 may need to be synchronized with each other and/or with the incoming optical data signal LS to reset and precharge the voltages V1 and V2, respectively, in desired times.

Figure 3A:
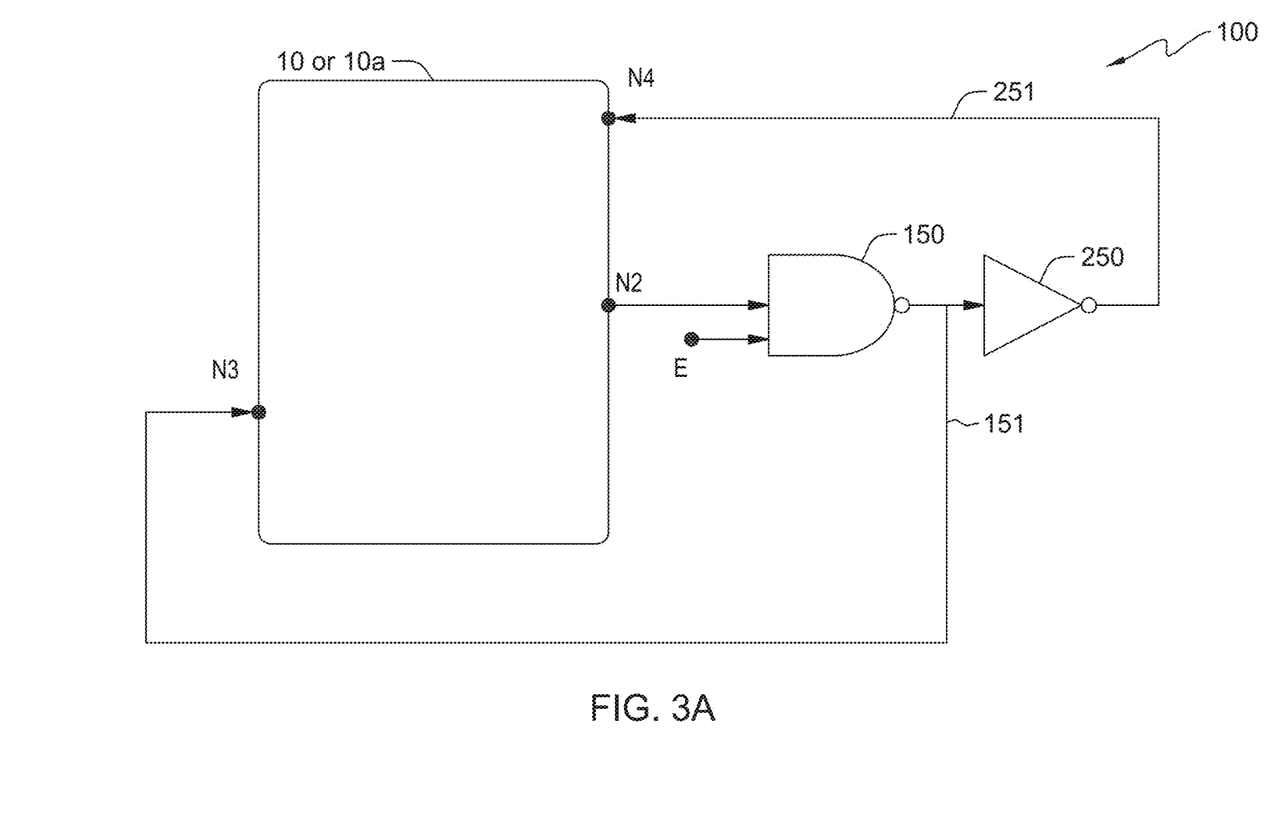
FIG. 3A illustrates a circuit diagram of a self-clocked photoreceiver according to a non-limiting exemplary embodiment of the present disclosure.
Figure 3B:
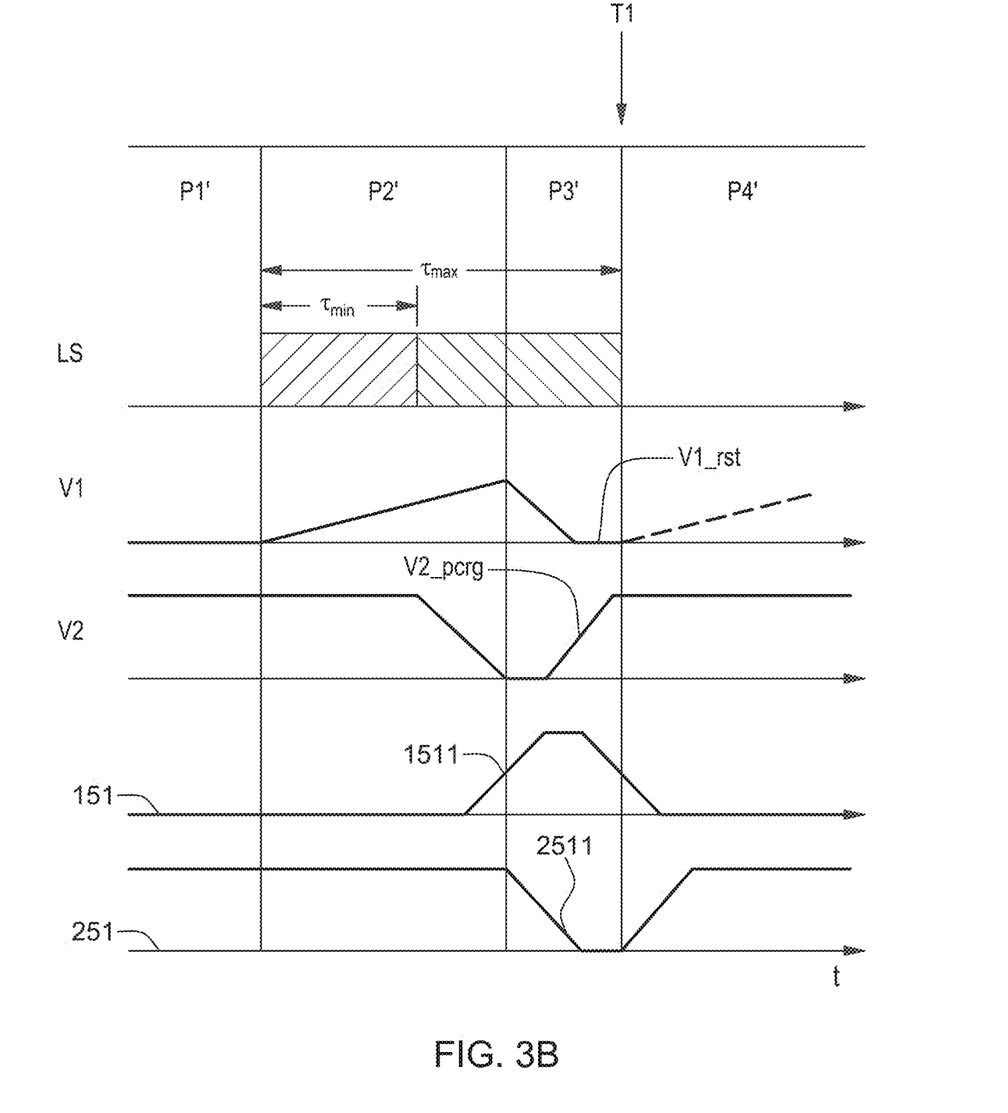
FIG. 3B illustrates a conceptual diagram of signal waveforms of the photoreceiver of FIG. 3A according to a non-limiting exemplary embodiment of the present disclosure.

FIG. 3A illustrates a circuit diagram of a self-clocked photoreceiver 100 according to a non-limiting exemplary embodiment of the present disclosure. FIG. 3B illustrates a conceptual diagram of signal waveforms of the photoreceiver 100 of FIG. 3A according to a non-limiting exemplary embodiment of the present disclosure.

Compared to the photoreceiver 10 or 10a, synchronization requirements on the clock pulses Clk1 and Clk2 of the self-clocked photoreceiver 100 may be relaxed due to its self-clocking feature.

Referring to FIG. 3A, the self-clocked photoreceiver 100 may include the photoreceiver 10 of FIG. 1A or 10a of FIG. 2A, an NAND logic gate 150, and an inverter 250. One input node of the NAND logic gate 150 may be connected to the node N2 to receive the output voltage signal V2 of the photoreceiver 10 or 10a. Further, the NAND logic gate 150 may further receive an enable signal E through another input node, and output a logic low when both of the voltage signal V2 and the enable signal E are logic high and output a logic high when at least one of the voltage signal V2 and the enable signal E is a logic low. The output signal 151 of the NAND logic gate 150 may be provided to the node N3 corresponding to the control node of the switching unit 111 of FIG. 1A or 111a of FIG. 2A and to the inverter 250.

The inverter 250 may be configured to receive the signal 151 from the NAND logic gate 150, invert the received signal 151, and output the inverted signal 251 to the node N4 corresponding to the control node of the switching unit 113 of FIG. 1A or 113a of FIG. 2A.

For example, unlike the photoreceiver 10 or 10a where clock pulses Clk1 and Clk2 provided from an external device are applied to the nodes N3 and N4, respectively, for the resetting of the voltage signal V1 and the precharging of the voltage signal V2, the photoreceiver 100 of FIG. 3A employs a self-clocking feature where the signals 151 and 251 obtained by using the voltage signal V2 of the photoreceiver 10 or 10a are applied to the nodes N3 and N4.

Referring to FIG. 3B, in an initial phase P1' which is prior to detection (or receipt) of the optical data signal LS (e.g., when no optical data signal is incident to the photoreceiver 100), the photoreceiver 100 may become in a ready state to detect the optical data signal LS, where a voltage signal at the node N3 is logic low, a voltage signal V2 at the node N2 is precharged logic high, and the enable signal is logic high.

In a second phase P2' subsequent to the initial phase P1', the optical data signal LS may be incident to the light detector 110 of the photoreceiver 100 to generate photocurrent which gradually increases the voltage signal V1 at the node N1 and pulls down (or decreases) the voltage signal V2 at the node N2. In the second phase P2', the enable signal E is a logic high, and thus, when the voltage signal V2 is pulled down, the signal 151 may increase to a logic high, as shown in a reference numeral 1511 of FIG. 3B, to switch on the switching unit 111 or 111a. Thus, in a third phase P3' subsequent to the second phase P2', when the switching unit 111 or 111a is switched on, the voltage signal V1 at the node N1 may be reset (or pulled down) to the ground level (or zero), as shown in a reference numeral V1_rst.

Further, in the third phase P3', as the signal 151 increases to the logic high, the signal 251 may decrease to a logic low, as shown in a reference numeral 2511 of FIG. 3B, to switch on the switching unit 113 or 113a. Thus, when the switching unit 113 or 113a is switched on, the voltage signal V2 at the node N2 may be precharged (or pulled up) to, e.g., the supply voltage, as shown in a reference numeral V2_perg.

Thus, at a time of T1 (corresponding to a time when the third phase P3' ends), the voltage signal V1 at the node N1 may become reset to the ground level (or zero) and the voltage signal V2 at the node N2 may become precharged to, e.g., the supply voltage, so that they may become ready to receive and decode a next data bit of the optical data signal LS.

Thus, the self-clocked photoreceiver 100 may generate output logic pulses of approximately fixed width gated by the frequency of the incoming light pulses. This can be disabled by the enable signal E. A pulse width of the incoming optical data signal LS may vary between $\tau_{min}$ and $\tau_{max}$ as shown in FIG. 3B. Here, $\tau_{min}$ is a minimum pulse width to trigger the self-clocked photoreceiver 100 (e.g., to switch on the switching unit 111 or 111a) and $\tau_{max}$ is a maximum pulse width during which the signal 151 reaches a logic high to reset the voltage signal V1 at the node N1 to the ground level (or zero).

A continuous light input may activate a cycle (e.g., a data bit) again once the voltage signal V3 at the node N3 is disabled (e.g., logic low), thus producing a train of data pulses. A frequency of the detected data pulses may increase with intensity of the optical data signal LS up to a maximum frequency determined by a delay propagating an available bit rate (ABR) loop.

Figure 3C:
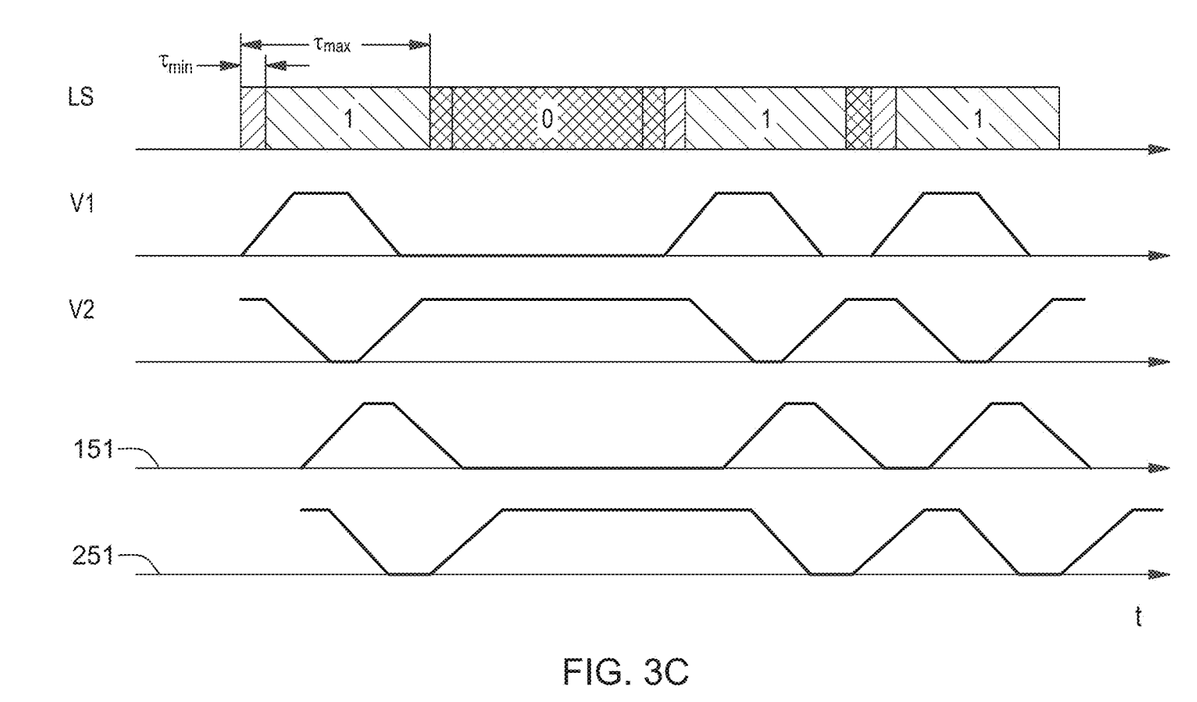
FIG. 3C illustrates a conceptual diagram of signal waveforms of the self-clocked photoreceiver of FIG. 3A according to a non-limiting exemplary embodiment of the present disclosure.

FIG. 3C illustrates a conceptual diagram of signal waveforms of the self-clocked photoreceiver 100 according to a non-limiting exemplary embodiment of the present disclosure.

Referring to FIG. 3C, it is assumed that the optical data signal LS with data bits "1011" is input to the self-clocked photoreceiver 100. The photoreceiver 100 may function correctly when an optical data signal LS is incident with magnitudes within a predetermined range and pulse widths ranging between $\tau_{min}$ and $\tau_{max}$.

As described above, since the photoreceiver 100 according to an embodiment resets the voltage signal V1 of the output node N1 of the light detector 110 and precharges the voltage signal V2 of the output node N2 of the photoreceiver 100 prior to the detection (or receipt) of the optical data signal LS, shot noises due to the bias current may be eliminated during the detection (or the receipt) of the optical data signal LS and requirements for precise bias current control may be relaxed.

Further, since the photoreceiver 100 according to an embodiment utilizes self-clocked pulses 151 and 251 to reset the voltage signal V1 and precharge the voltage signal V2, respectively, synchronization requirements on the incoming optical data signal LS may be relaxed, thereby increasing tolerance against pulse width variations of the input optical data signal LS.

Figure 4:
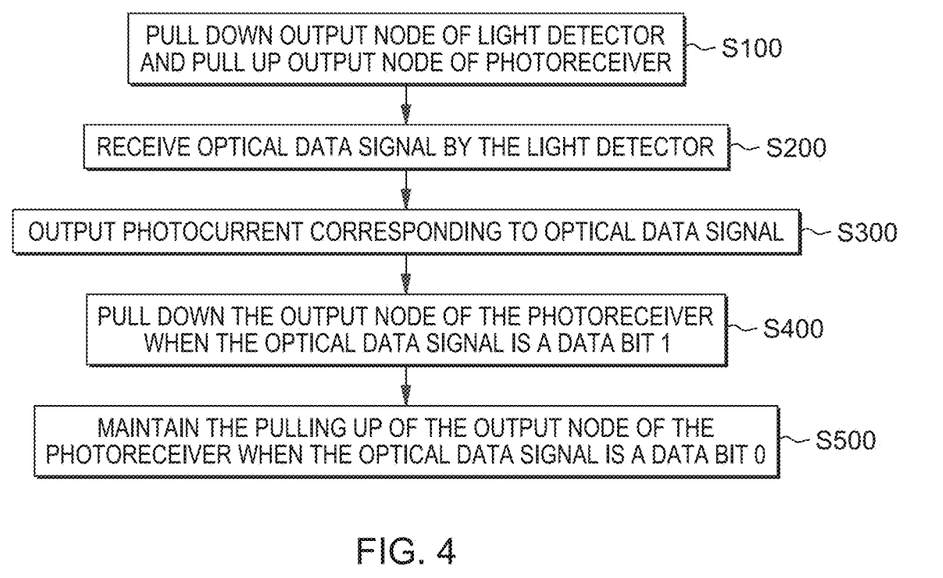
FIG. 4 is a flow chart illustrating a method of operating a photoreceiver according to a non-limiting exemplary embodiment of the present disclosure.

FIG. 4 is a flow chart illustrating a method of operating the photoreceiver 10, 10a, or 100 according to a non-limiting exemplary embodiment of the present disclosure.

Referring to FIG. 4, in an operation of S100, prior to receipt of an optical data signal LS, an output node (i.e., the node N1) of the light detector 110 may be pulled down (or a voltage signal V1 at the node N1 may be reset to the ground level or zero) by switching on the switching unit 111 or 111a based on a first control signal (e.g., Clk1, 151) and an output node (i.e., the node N2) of the photoreceiver 10, 10a, or 100 may be pulled up (or a voltage signal V2 at the node N2 may be precharged) by switching on the switching unit 113 or 113a based on a second control signal (e.g., Clk2, 251). In an operation of S200, the optical data signal LS may be received by the light detector 110. In an operation of S300, photocurrent corresponding to the optical data signal LS may be output from the light detector 110 through the node N1. In an operation of S400, the node N2 of the switching unit 113 or 113a may be pulled down by switching on the switching unit 112 or 112a when the optical data signal LS is a data bit 1. In an operation of S500, the pulling up of the node N2 may be maintained when the optical data signal LS is a data bit 0.

Further, when in used, the photoreceiver 100 according to an embodiment reduces or minimizes power consumption.

Figure 5:
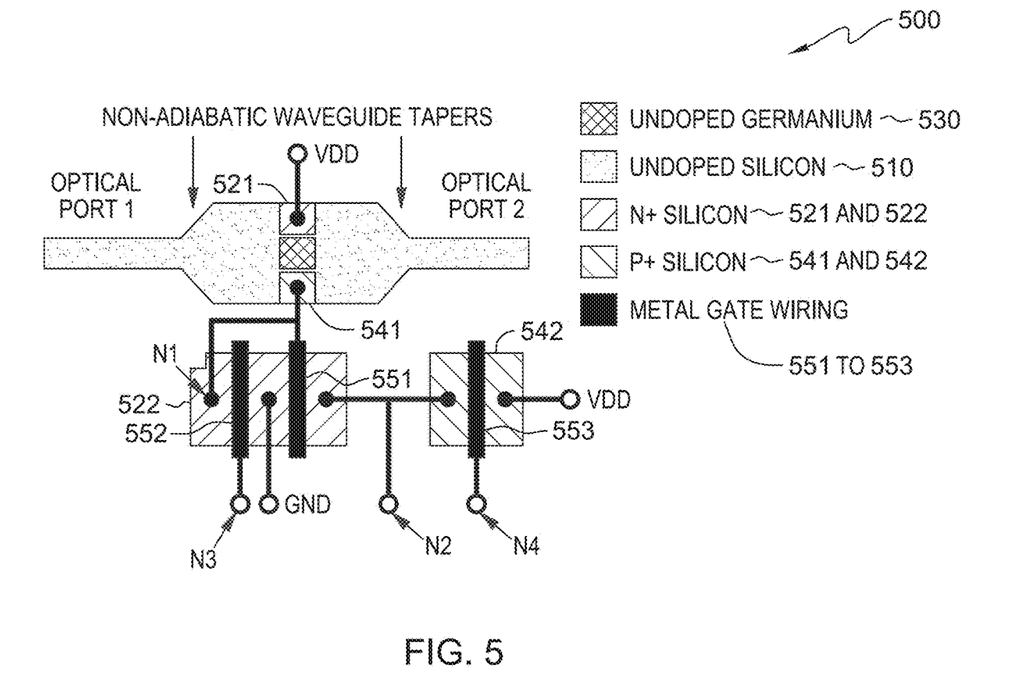
FIG. 5 illustrates a layout for monolithic integration of a photoreceiver according to a non-limiting exemplary embodiment of the present disclosure.

To implement the photoreceiver 100 as described, a low parasitic interface between a photodiode (e.g., 410) and transistors (e.g., 111a to 113a) may be critical. FIG. 5 illustrates a layout for monolithic integration of a photoreceiver 500 according to a non-limiting exemplary embodiment of the present disclosure.

Referring to FIG. 5, the layout of the photoreceiver 500 may include an undoped silicon waveguide 510, n-type silicon regions 521 and 522, an undoped germanium region 530, p-type silicon regions 541 and 542, and metal gate wirings 551 to 553. The nodes N1 to N4 of FIG. 5 may respectively correspond to those of FIG. 3A. The n-type silicon region 521, the undoped germanium region 530, and the p-type silicon region 541 which constitute a light detector (e.g., photodiode) may be formed on the undoped silicon waveguide 510 and electrically insulated one from another. The n-type silicon region 521 may be connected to the power supply node VDD. The p-type silicon region 541 may be connected to the node N1 formed on the n-type silicon region 522 and may be connected to the metal gate wiring 551 (e.g., gate of the switching unit 112a) formed on the n-type silicon region 522.

The node N2 may be connected between one electrode (e.g., drain of the switching unit 112a) formed on the n-type silicon region 522 and one electrode (e.g., source of the switching unit 113a) formed on the p-type silicon region 542.

The node N3 may be connected to the metal gate wiring 552 (e.g., gate of the switching unit 111a) formed on the n-type silicon region 522. Further, a ground node GND may be formed between the metal gate wirings 551 and 552 on the n-type silicon region 522.

The node N4 may be connected to the metal gate wiring 553 (e.g., gate of the switching unit 113a) formed on the p-type silicon region 542. Further, an electrode (e.g., drain of the switching unit 113a) formed on the p-type silicon region 542 may be connected to the supply node VDD with the supply voltage.

The undoped silicon waveguide 510 may include a non-adiabatic tapered waveguide connected between an input waveguide (i.e., optical port 1) and an output waveguide (i.e., optical port 2), as shown in FIG. 5.

In one embodiment, the undoped silicon waveguide 510 may have a high refractive index contrast to guide incident light to a small volume and an absorbing media to form the light detector 410. Thus, all of these functionalities may be provided in a platform that is in the same physical layer as the transistors (e.g., 111a to 113a) to enable ultra-low parasitic interfaces between the complementary metal-oxide-semiconductor (CMOS) and the photonics.

Figure 6:
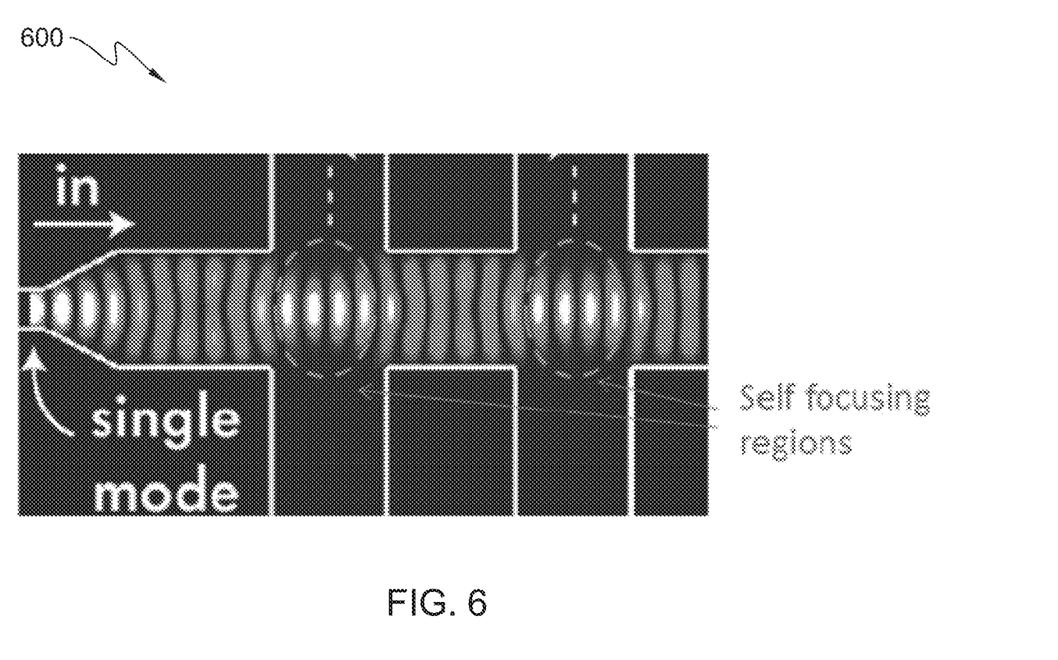
FIG. 6 is a diagram for explaining a self-focusing for a light detector for loss avoidance according to a non-limiting exemplary embodiment of the present disclosure.

FIG. 6 is a diagram for explaining a self-focusing for a light detector 600 for loss avoidance according to a non-limiting exemplary embodiment of the present disclosure.

Referring to FIG. 6, the optical design for a low capacitance light detector 600 (e.g., photodiode) may utilize a higher order mode focusing section (e.g., self focusing region) to localize the light to a small absorbing region.

The absorbing region in this case may be formed using epitaxial germanium that can be integrated with a small footprint that is limited only by lithographic patterning capabilities. In an example implementation, the germanium region could be grown in, e.g., a 100 nm×100 nm region that is located in a 100 nm long P-i-N silicon diode with a 600 nm intrinsic region width to reduce capacitance.

Figure 7A:
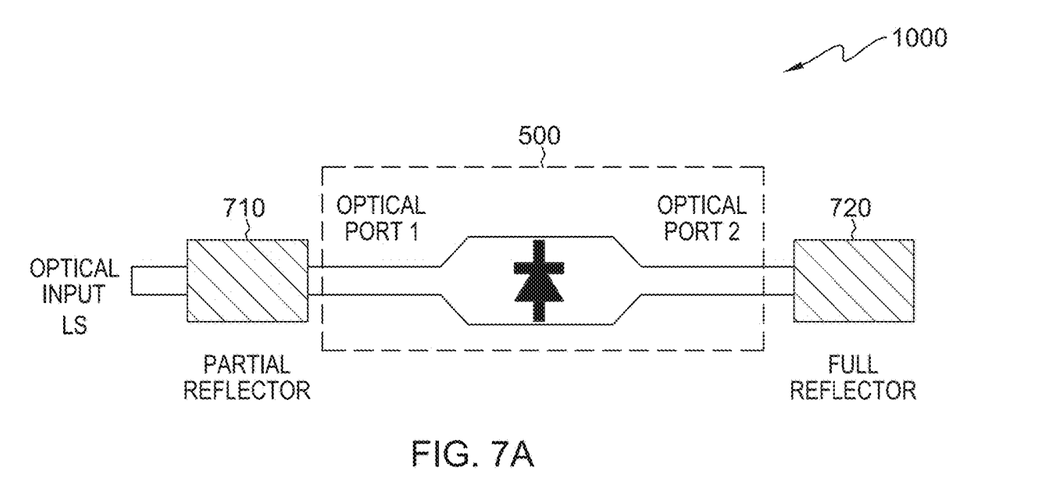
FIG. 7A illustrates a block diagram of an enhanced photoreceiver system using an optical resonator according to a non-limiting exemplary embodiment of the present disclosure.
Figure 7B:
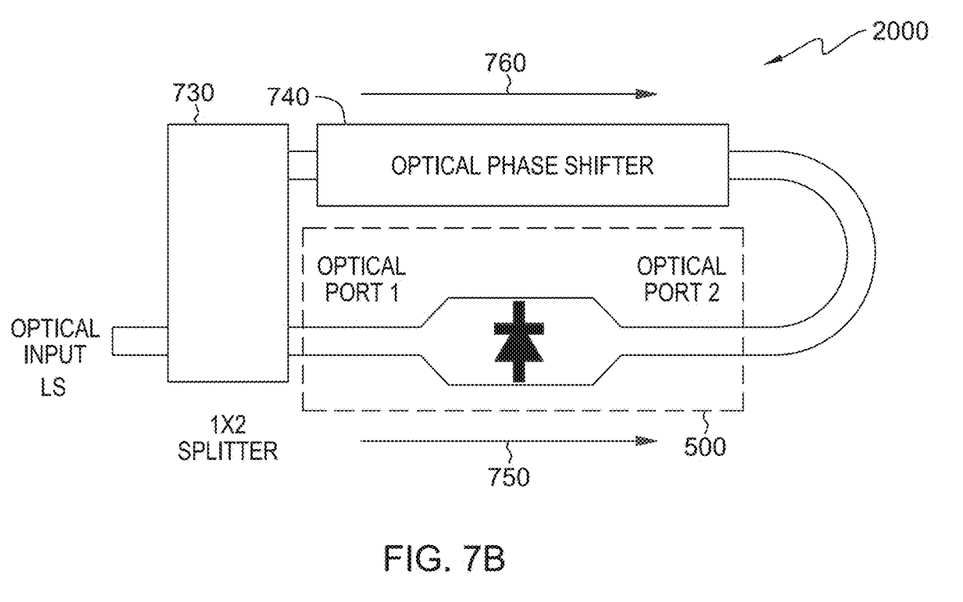
FIG. 7B illustrates a block diagram of an enhanced photoreceiver system using a perfect coherent absorber according to a non-limiting exemplary embodiment of the present disclosure.

The relatively small single pass absorption of this nanoscale light detector 600 can be enhanced up to the quantum efficiency limit by the formation of an optical resonator, as shown in FIG. 7A or a coherent absorber, as shown in FIG. 7B.

FIG. 7A illustrates a block diagram of an enhanced photoreceiver system 1000 using an optical resonator according to a non-limiting exemplary embodiment of the present disclosure. FIG. 7B illustrates a block diagram of an enhanced photoreceiver system 2000 using a perfect coherent absorber according to a non-limiting exemplary embodiment of the present disclosure.

Referring FIG. 7A, the enhanced photoreceiver system 1000 may include the photoreceiver 500 of FIG. 5, a partial reflector 710, and a full reflector 720. The full reflector 720 may have reflective of 100% to incident light and the partial reflector 710 may has reflectivity (e.g., 10%, 30%, 50% or 70%) less than 100% to incident light.

Therefore, if the photoreceiver 500 is formed between the reflectors 710 and 720 as shown in FIG. 7A, the enhanced photoreceiver system 1000 may form an optical resonator with a cavity between the reflectors 710 and 720 to enhance absorption efficiency by the light detector 110.

Referring FIG. 7B, the enhanced photoreceiver system 2000 may include the photoreceiver 500 of FIG. 5, an optical power splitter 730, and an optical phase shifter 740. The optical data signal LS may be split in power, by the optical power splitter 730, into two optical paths 750 and 760 where each of the split optical data signals LS travels along with a corresponding one of the two optical paths 750 and 760.

For example, the optical data signal LS propagating along with the optical path 750 may first pass through the photoreceiver 500 and then pass through the optical phase shifter 740, and the optical data signal LS propagating along with the optical path 760 may first pass through the optical phase shifter 740 and then pass through the photoreceiver 500. The optical data signals LSs which respectively propagating along with the optical paths 750 and 760 may be combined in power by the optical power splitter 730. The optical phase shifter 740 can be controlled to adjust phases of the optical data signals LSs for generating the perfect coherent absorption to enhance absorption efficiency by the light detector 410.

The self-clocked photoreceiver 100 may place enhanced importance on an extinction ratio of the incident optical data signal LS. Under the optical '0' illumination, the self-clocked photoreceiver 100 might not produce a data pulse, and thus, spurious output data may be output in the absence of '1' data bits. For example, the length of data bits '0' sequences that must be tolerated may depend on the data communication protocol where the self-clocked photoreceiver 100 is used, but may range between, e.g., 8 and 64 bits.

The limitation on the number of data bits '0' may be set by the extinction ratio (e.g., power ratio of the '1' to the '0') of the optical data signal LS and the required operating dynamic range (e.g., power ratio of a maximum allowed '1' level to a minimum allowed '1' level).

For example, if the self-clocked photoreceiver 100 is used in a traditional standards-based data communication system where an extinction ratio of an incident optical data signal is relatively low (e.g., 4 dB) and an allowable dynamic range is relatively high (e.g., more than of 10 dB), the self-pulsing and incorrect data outputs may occur due to the light level associated with the '0' bits.

In one embodiment, the photoreceiver (e.g., 10, 10a, or 100) may be applied for ultra-low transmit power inter- and intra-chip interconnect.

In these applications, the dynamic range can be adjusted and controlled. The extinction ratio can either be specified to high extinction ratios (e.g., 20 dB) that are compatible with high performance ratios or eliminated by the use of direct on/off modulated transmitters. For such next generation inter- and intra-chip communication protocols where receiver sensitivities may be of paramount importance, transmitters such as photonic crystal lasers may be envisioned for maximum energy efficiency. These transmitters may be truly off in the '0' bit, thereby eliminating critical extinction ratio requirements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the present disclosure has been particularly shown and described with respect to preferred embodiments thereof, it will be understood by those skilled in the art that the foregoing and other changes in forms and details may be made without departing from the spirit and scope of the present disclosure. It is therefore intended that the present disclosure not be limited to the exact forms and details described and illustrated, but fall within the scope of the appended claims.

What is claimed is:

1. A receiver system comprising a photoreceiver device, wherein the photoreceiver device comprises:
a light detector connected between a power supply node and a first node, the light detector configured to detect an incident optical data signal, and to output photocurrent corresponding to a magnitude of the optical data signal through the first node;
a first switching element connected between the power supply node and a second node, the first switching element being configured to be switched on or off based on a control signal; and
a second switching element connected between the second node and a ground node, the second switching element has a control node connected to the first node.

2. The system of claim 1, wherein each of the first and second switching elements is a transistor.

3. The system of claim 1, wherein a magnitude of the control signal is generated based on a voltage signal at the power supply node.

4. The system of claim 1, wherein the photoreceiver device further comprises:
a silicon waveguide in which the light detector is formed, wherein the silicon waveguide and the first and second switching elements are implemented in a same physical level.

5. The system of claim 1, further comprising:
an optical resonator in which the photoreceiver device is disposed.

6. The system of claim 1, further comprising:
an optical coherent absorber in which the photoreceiver device is disposed, wherein the optical coherent absorber further including a phase shifter and an optical power splitter configured to divide the optical data signal into first and second path signals, wherein the first path signal passes through first the photoreceiver device and next the phase shifter, wherein the second path signal passes through first the phase shifter and next the photoreceiver device, and wherein the first and second path signals obtained after passing through the photoreceiver device and the phase shifter are combined through the optical power splitter.

7. The system of claim 1, further comprising: a third switching element connected between the first node and the ground node, said third switching element receiving a further control signal for resetting said first node to ground prior to detecting an incident optical data signal.

8. A method of operating a photoreceiver device including first and second switching elements and a light detector, wherein a supply voltage is applied to a first node of the light detector and a first node of the first switching element, comprising:

prior to receipt of an optical data signal, pulling up a second node of the first switching element by switching on the first switching element based on a control signal;

receiving the optical data signal by the light detector;

outputting, by the light detector, photocurrent corresponding to the optical data signal through a second node of the light detector;

pulling down the second node of the first switching element by switching on the second switching element when a magnitude of the optical data signal is greater than a predetermined value; and maintaining the pulling up of the second node of the first switching element when the magnitude of the optical data signal is smaller than the predetermined value, wherein the second switching element is connected between the second node of the first switching element and a ground node.

9. The method of claim 8, wherein each of the first and second switching elements is a transistor.

10. The method of claim 9, wherein the second switching element is an n-channel metal-oxide semiconductor field effect transistor (MOSFET), and the first switching element is a p-channel MOSFET.

11. The method of claim 8, wherein the control signal is generated based on the power supply voltage.

12. The method of claim 8, further comprising: receiving, at a third switching element connected between the first node and the ground node, a further control signal for resetting said first node to ground prior to detecting an incident optical data signal.

* * * * *